Figure 3:
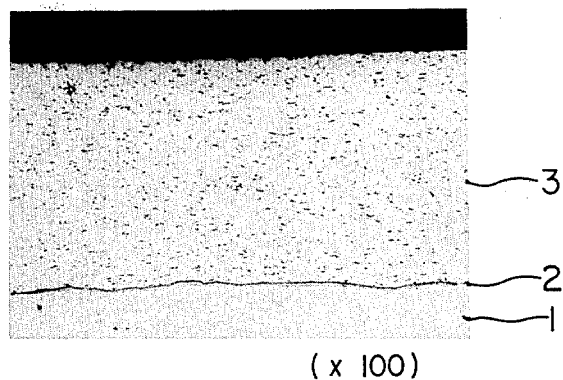

United States Patent [19]
Mori

[11] 4,170,469
[45] Oct. 9, 1979

[54] ALUMINUM BASE BEARING ALLOY AND A COMPOSITE BEARING MADE OF THE ALLOY WITH A STEEL BACKING PLATE

[75] Inventor: Sanae Mori, Nagoya, Japan

[73] Assignee: Daido Metal Company Ltd., Nagoya, Japan

[21] Appl. No.: 879,977

[22] Filed: Feb. 22, 1978

[30] Foreign Application Priority Data

Aug. 9, 1977 [JP] Japan ............... 52-95354

[51] Int. Cl.$^2$ .................. C22C 21/02; B21D 53/10
[52] U.S. Cl. ............................... 75/141; 75/143; 75/146; 75/148; 148/159; 428/652
[58] Field of Search ............... 75/141, 143, 146, 149, 75/138; 148/159; 428/652

[56] References Cited

U.S. PATENT DOCUMENTS

| | | | |
|---|---|---|---|
| 2,026,545 | 1/1936 | Kempf et al. | 75/1 |
| 2,568,180 | 9/1951 | Willmore | 75/141 |
| 2,759,250 | 8/1956 | Schaefer et al. | 29/196.6 |
| 3,268,369 | 8/1966 | Haugen | 148/12.7 |
| 3,314,829 | 4/1967 | Sunnucks | 148/32.5 |
| 3,652,344 | 3/1972 | Kingsbury et al. | 148/127 |

OTHER PUBLICATIONS

Bearing Alloys in Metals Reference Book, Ed. C. J. Smithels Buttersworth, London, 1976, pp. 1259-1261.

Primary Examiner—L. Dewayne Rutledge
Assistant Examiner—Upendra Roy
Attorney, Agent, or Firm—Karl W. Flocks

[57] ABSTRACT

A composite bearing composed of a bearing alloy consisting of 2-8% Zn, 2-8% Si, 0.1-3% Cu, and 0.1-3% Pb all by weight with the remainder being aluminum and a steel backing lined with said bearing alloy. This bearing alloy has outstanding non-sticking property and fatigue strength and is best suited for medium and high speed diesel engine bearings. This bearing alloy may further contain 0.2-7% in total of one or more elements selected from the group consisting of Mg, Ni, and Bi with their respective composition limits being 0.1-2%, 0.1-3% and 0.1-2% by weight.

10 Claims, 5 Drawing Figures

FIG. 1

| ITEM | SAMPLE No. | BEARING LOAD (Kg/cm²) 400 — 450 — 500 — 550 |
|---|---|---|
| CONVENTIONAL BEARING | 1 | → NO FATIGUE → SHOWING FATIGUE / SEIZED |
| | 2 | → NO FATIGUE → SHOWING FATIGUE / NOT SEIZED → SHOWING FATIGUE |
| | 3 | → NO FATIGUE → SHOWING FATIGUE |
| | (3) | → NO FATIGUE / NO FATIGUE |
| | 4 | → NOT SEIZED / SEIZED |
| | 5 | → NO FATIGUE / SHOWING FATIGUE |
| EMBODIMENTS OF THIS INVENTION | 6 | → NO FATIGUE |
| | 7 | → NO FATIGUE |
| | 8 | → NO FATIGUE |
| | 9 | → NO FATIGUE |
| | 10 | → NO FATIGUE |

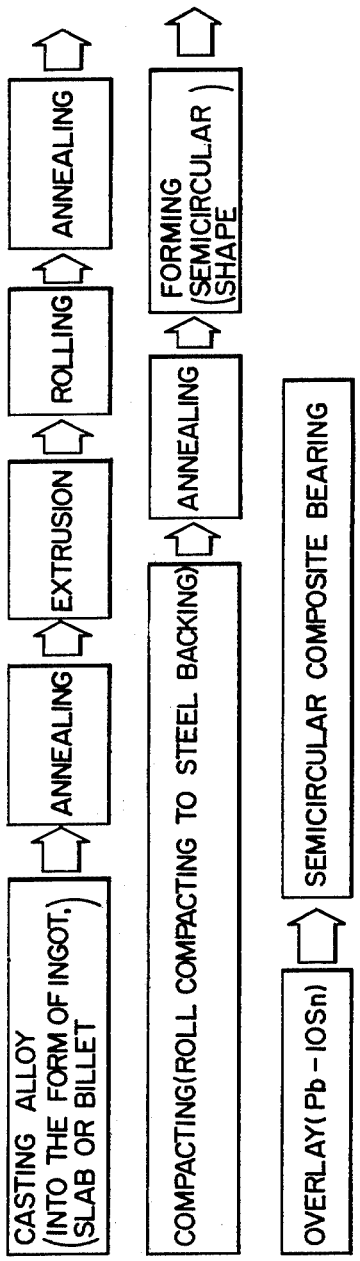
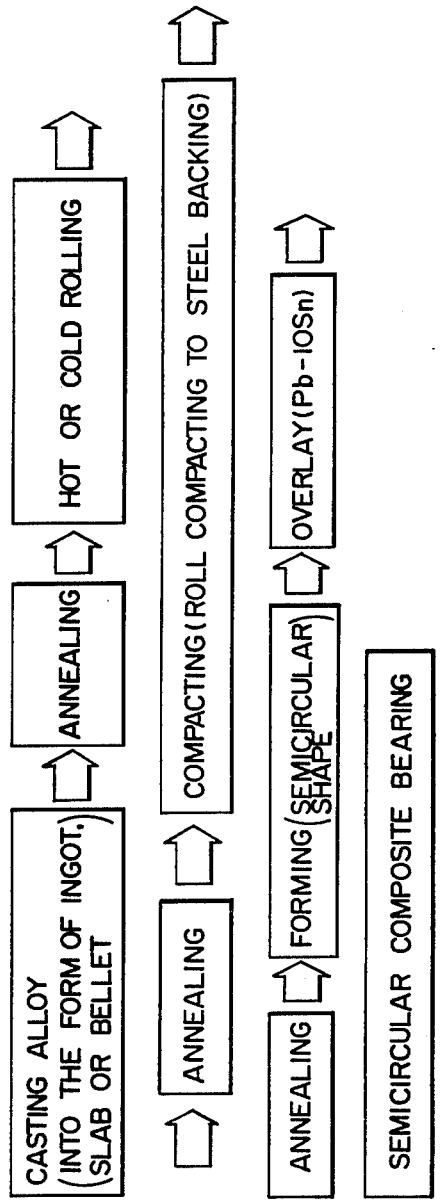

(× 100)

(× 100)

ALUMINUM BASE BEARING ALLOY AND A COMPOSITE BEARING MADE OF THE ALLOY WITH A STEEL BACKING PLATE

The present invention relates to a new aluminum base bearing alloy and a composite bearing using the alloy. More particularly, this invention relates to an aluminum base bearing alloy having excellent non-sticking property and fatigue strength which are very important bearing characteristics and also to a composite bearing composed of the alloy with steel backing.

For heavily loaded services such as medium to high speed diesel engine bearings, there had been conventionally used generally three types of bearing alloys as noted below:
(1) copper-lead alloys (Kelmet or lead-bronze alloys)
(2) low-tin aluminum base bearing alloys
(3) Al-Si-Cd type aluminum base bearing alloys In view of the recent progress in diesel engines, however, it has become impossible for these alloys to satisfy all the bearing requirements. The drawbacks of the alloys (1) through (3) above can be enumerated as follows:

(1) Copper-lead alloys (Kelmet or lead-bronze)

These alloys have a drawback that the lead in the alloys is severely corroded due to the excessive oxidation and deterioration of the engine oil which have been brought about by the measures taken against environmental pollution and to improve engine efficiency.

(2) Low tin aluminum base bearing alloys

Due to the recent tendency towards higher engine oil temperatures, they tend to suffer from unstable bonding strength to the backing metal during the high temperature running and they also have an uncertainty in their resistance against cavitation during high speed running, although they have a fair corrosion resistance.

(3) Al-Si-Cd type aluminum-base bearing alloys

Alloys of this type have excellent corrosion resistance, high anti-cavitation property and high bonding strength at high temperature; these alloys, however, contain a particular element cadmium which causes serious environmental pollution problems. Besides, they appear to be somewhat unsatisfactory in their non-sticking property once the overlay (the surface layer) has worn away.

It is an object of the present invention to provide a bearing alloy and a composite bearing using the bearing alloy wherein such drawbacks are obviated and its bearing characteristics are more improved.

It is another object of the present invention to provide a novel aluminum base bearing alloy and a composite bearing using the alloy both having an excellent non-seizure property and an outstanding endurance property, both of which are very important characteristics for bearings.

According to the present invention, there are provided:

(1) an aluminum base bearing alloy consisting of 2–8% by weight of zinc, 2–8% by weight of silicon, 0.1–3% by weight of copper and 0.1–3% by weight of lead with the remainder being substantially aluminum;

(2) an aluminum base bearing alloy containing 2–8% zinc, 2–8% silicon, 0.1–3% copper, 0.1–3% lead, and 0.2–2% in total of one or more elements selected from the group consisting of magnesium, nickel and bismuth, with their respective composition limits being 0.1–2%, 0.1–3% and 0.1–2%, all by weight and the remainder substantially being aluminum;

(3) a composite bearing comprising a layer of aluminum base bearing alloy as described in item (1) above, which is bonded to a steel backing plate with or without a thin plating such as nickel, and then formed to the desired shape;

(4) a composite bearing comprising the aluminum base bearing alloy as described in item (2) above, which is bonded to a steel backing plate with or without a thin plating of metal such as nickel, and then formed to the desired shape;

(5) a composite bearing as shown in item (3) above, wherein the surface of said aluminum base bearing alloy is further overlaid with a soft metal or with said alloy; and (6) a composite bearing as shown in item (4) above, wherein the surface of said aluminum base bearing alloy is further overlaid with a soft metal or with said alloy.

The characteristics of the alloy and composite bearing of the present invention are as follows:

(1) Zinc which exists as solute metal in a primary solid solutions of an aluminum rich phase, cooperates with silicon and lead particles which precipitate and being dispersed in the phase remarkably improve the bearing characteristics, especially anti-seizure property (anti-welding or anti-adhering) property.

(2) The composite bearing of this invention is able to withstand a load which exceeds the endurance limits of the strongest conventional aluminum base or copper base bearing alloys in terms of endurance with respect to bearing surface pressure. Therefore, it is best suited for heavy load applications.

Next, the reasons for limiting the content of the constituent elements of the bearing alloy of this invention as described above and the meritorious effects obtained from the thus limited elements will be explained item by item.

(1) Si: 2–8% by weight (1) Because of the fine grains of silicon having high hardness (Hv 599 approx.) and their being scattered in the aluminum matrix, only the soft aluminum matrix at the surface layer wears, rendering the surface thereof microscopically uneven, namely, having indented portions and raised portions. The silicon in the raised portions endures heavy loads while maintaining the non-sticking property of the bearing. On the other hand, the indented portions of Al matrix serve to act as sort of oil reservoirs. In this way, the silicon helps the bearing to withstand a heavy load and metallic contacts even when there is only a thin oil film.

(2) When the aluminum matrix comes into an instantaneous metallic contact with the mating surface of the shaft, the non-sticking property of the silicon at the surface together with non-metal flow ability of the aluminum matrix being tightly held by a silicon core prevent the bearing alloy from galling or from being fluidized.

(3) If the amount of added silicon is less than 2%, the silicon cannot display the properties mentioned in (1) and (2) above as well as its wear resistance. If more than 8% by weight of silicon is added, the alloy becomes brittle and deteriorated in its impact strength, moreover, because of the decrease in toughness, it is also deteriorated in its workability in connection with plastic deformation, such as rolling, extrusion or the like.

(2) Zn: 2–8% by weight (1) Solute metal of zinc in the primary solid solution of aluminum rich matrix changes the lattice spacing of the space lattice and decreases its weldability.

(2) Preferential oxidation of zinc takes the place of the oxidation of aluminum thus prevents the formation of a deterimental hard film of aluminum oxide.

(3) The alloy's capacity of holding lubricating oil is increased.

(4) If the amount of zinc added is less than 2%, the non-seizure property and wear resistance property of the alloy is lowered. The addition of zinc in excess of 8% induces a danger of stress corrosion cracking and lowers the toughness. Besides, when overlaying a mild material on the surface of the alloy by means of, for instance, electroplating or roll-bonding, it presents a problem of its poor bonding property.

(3) Cu: 0.1–3% by weight (1) The addition of copper increases the strength of the aluminum matrix. It is very effective for increasing the fatigue strength of the alloy. When it becomes too hard, however, it presents a problem in compatibility. The same is true for the addition of nickel.

(2) The addition of less than 0.1% of copper does not produce any advantageous effect and an addition in excess of 3% thereof deteriorates the compatibility and toughness.

(4) Pb: 0.1–3% by weight

The addition of lead improves both the machinability and anti-seizure properties. However, no appreciable effect can be obtained with less than 0.1% lead. On the other hand, the addition of more than 3% lead renders the uniform distribution of the lead in the aluminum matrix difficult and has an adverse effect on the strength of the alloy.

(5) Mg: 0.1–2% by weight

As magnesium increases the properties of the alloy after heat treatment, it is effective to add magnesium when higher strength is required. In this case, the addition of less than 1% magnesium does not produce any such effect. The addition of more than 2% magnesium, however, renders the alloy too hard and deteriorates both its compatibility and toughness.

(6) Ni: 0.1–3% by weight

Nickel increases fatigue strength either by existing as solute metal in the primary aluminum rich solid solutions or by precipitating out as intermetallic compounds. If the amount of nickel added is less than 0.1%, little effect can be seen. When the amount of nickel exceeds 3%, the alloy becomes brittle. Besides nickel, other elements such as chromium, titanium boron and zirconium that are usually added to aluminum alloys as hardening agents are also found to be effective in increasing the fatigue strength of the alloy of this invention.

(7) Bi: 0.1–2% by weight

The addition of bismuth improves the machinability and anti-seizure property of the alloy. With less than 0.1% bismuth, no effect can be observed. The addition in excess of 2%, however, renders the uniform dispersion of added Bi difficult and adversely affects the strength of the alloy.

FIG. 1 is a graph showing the results of a fatigue test carried out on the conventional composite bearings and the composite bearings of this invention.

FIGS. 2(a) and (b) are flow charts to explain the basic processes of manufacturing the composite bearings in accordance with the present invention.

Figure 4:
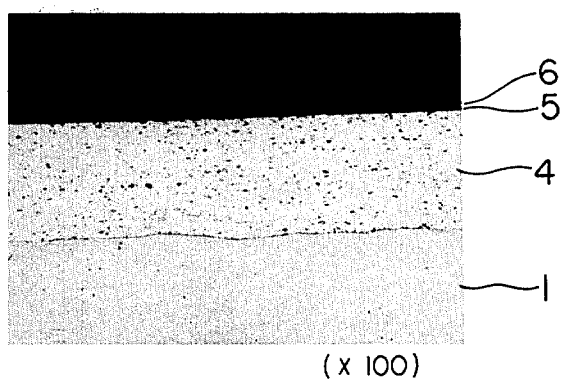

FIGS. 3 and 4 are optical microphotographs showing the structures, of 100 magnifications, of the embodiments of the present invetnion.

Now the embodiments of this invention will be explained in detail.

Table 1 shows the test conditions under which a fatigue test and an anti-seizure test were carried out on the samples No. 1 through No. 10 described below. Table 2 lists the chemical compositions, mechanical properties and bearing construction of those samples. Table 3 shows the results of the anti-seizure test on those samples.

Table 1

| | Testing Conditions | | |
|---|---|---|---|
| | Fatigue Test | Compatibility or Anti-Seizure Test | |
| Testing machine | Masuda dynamic loading testing machine | Testing machine | Sapphire testing machine |
| Speed of rotations | 4000 r.p.m. | Speed of rotations | 3250 r.p.m. |
| Test time | 20 hrs. | Peripheral speed | 9.0 m/sec. |
| Peripheral speed | 13 m/sec. | Oil temperature | 90°–95° C. |
| Oil Temperature | 120° C. | Oil pressure | 4.5 Kg/cm$^2$ |
| Oil pressure | 31 kg/cm$^2$ | Amount of oil supplied | 20 c.c./min. |
| Lubricating oil | SAE 20 | Oil clearance | 0.04–0.06 mm |
| Oil supply angle | Advance angle of 36° | Lubricating oil | SAE 20 |
| Method of evaluating the fatigue | When more than 5% of the bearing surface area was found to be fatigued. | Loading system | After it had been run for 15 min. without load, a load of 700 kg/cm$^2$ was applied for the first 10 min. and then the load was gradually increased in increments of 70 kg/cm$^2$ for each additional 10 min. (Max. 1610 kg/cm$^2$) |
| | | Method of judging the seizure point | When the temperature at the back of the bearing exceeded 200° C. or when the motor showed a sign of overloading. |

Table 2

| Type | Sample No. | Chemical compositions of bearing alloy layers (% by weight) | | | | | | | | Mechanical Properties | | | |
|---|---|---|---|---|---|---|---|---|---|---|---|---|---|
| | | Si | Zn | Cu | Pb | Mg | Mn | Sn | Others | Al | Tensile strength (kg/mm²) | Elongation | Adhesive strength (kg/mm²) | Hardness (Hv) |
| Conventional bearing | 1 | — | — | Rem. | 23 | — | — | 3 | — | Rem. | 16 | 2 | 11.5 | 60 |
| | 2 | — | — | 1 | — | — | — | 6 | Ni 1 | " | 13 | 22 | 7.5 | 35 |
| | 3 | 4 | — | 0.1 | — | 0.15 | — | — | Cd 1 | " | 14 | 31 | 7.5 | 43 |
| | 4 | 1.5 | 5 | 1 | 1 | 0.5 | — | — | — | " | 23 | 21 | 10.5 | 70 |
| | 5 | — | 4.3 | — | — | 1.5 | 0.5 | — | — | " | 21 | 25 | 10.0 | 60 |
| embodiments of this invention | 6 | 3 | 3.5 | 0.8 | 1 | — | — | — | — | " | 17 | 30 | 9.0 | 43 |
| | 7 | 6 | 4 | 1 | 0.5 | 0.5 | — | — | — | " | 22 | 20 | 9.7 | 55 |
| | 8 | 3 | 4.5 | 0.15 | 1 | — | — | — | Bi 1 | " | 14 | 35 | 7.3 | 38 |
| | 9 | 2 | 6 | 0.3 | 1 | 0.8 | — | — | Bi 1 | " | 20 | 23 | 9.5 | 55 |
| | 10 | 3 | 5 | 0.5 | 1 | — | — | — | Ni 0.5 | " | 18 | 27 | 9.0 | 45 |

Note:
Bearing construction: Steel back layer + Bearing alloy layer + Overlaid surface layer (The overlay consists of 10% Sn and the remainder Sb.)

Table 3

| | | Results of Anti-Seizure Test | | | | | | | |
|---|---|---|---|---|---|---|---|---|---|
| | | Test Results | | | | | | | |
| Type | Sample No. | Test Load (kg/cm²) | | | | | | | |
| | | 1120 | 1190 | 1260 | 1330 | 1400 | 1470 | 1540 | 1610 |
| Conventional bearing | 1 | 0 | | o | o | | | | |
| | 2 | o | o | | o | | | | |
| | (3) | | | | | o | o o | | |
| | 4 | | | | | | o o | o | |
| Embodiments of this invention | 6 | | | | | | | o | o o |
| | (6) | | | | | | | o o | o |
| | 7 | | | | | | | ooo | |
| | 8 | | | | | | | | ooo |
| | 9 | | | | | | | o | o o |
| | 10 | | | | | | | o o | o |

Notes:
1. Sample (3) is a sample obtained by hardening Sample 3 of Table 2 by heat-treatment.
2. Sample (6) is same as Sample 6 except that Sample (6) does not have the overlay. It exhibits an excellent galling resistance even without overlay.
3. The mark o indicates the load just before seizure or sticking.
4. The circles o under the column of 1610 kg/cm² means that the samples were not seized.
5. The best was repeated three times for each sample and each result was noted by the mark o. The conventional alloys showed early seizure varying from sample to sample.

Sample 1 (Equivalent to SAE 799)

The pre-alloyed powder as per No. 1 in Table 2 was deposited on a steel plate and then sintered thereon in a furnace in a non-oxidizing atmosphere. A material thus prepared was compacted to the desired thickness and formed into a semicircular shape. Then the surface of said alloy was coated with an alloy consisting of 10% by weight tin and the remainder lead by means of electroplating to produce a semicircular composite bearing.

Samples 2 through 10 (the conventional bearings No. 2 and No. 3 were made using materials equivalent to SAE 770 and SAE 787, respectively, No. 6 through No. 10 are embodiments of this invention).

Bearing alloys No. 2 through No. 10 as shown in Table 2 were made into semicircular composite bearings through either one of the two basic processes (a) and (b) as shown in FIG. 1. As can be noted from Table 3 and FIG. 1, the embodiments of this invention are much improved in their non-seizure properties and fatigue strengths in comparison with the conventional alloys. To explain more clearly, between the conventional alloys and the alloys of this invention, no remarkable differences could be observed with regard to their mechanical properties (tensile strength, elongation, bonding strength and hardness) as can be seen from Table 2, but once they are used to make up the composite bearings as described above, it becomes evident that they have practical effects greatly increasing the non-galling property and fatigue strength.

FIG. 3 and FIG. 4 are optical microphotographs with 100 magnification showing typical structures, of the embodiments of No. 6 and No. 7 of this invention respectively. Therein numeral 1 is a steel backing layer, 2 is a layer of nickel plating, 3 denotes a bearing alloy layer of Sample No. 6, 4 is a bearing alloy layer of Sample No. 7. 5 is a nickel plating layer and 6 is an overlay of lead-base alloy (Pb-10Sn).

It should be noted here that the embodiments No. 6 through No. 10 may or may not be provided with a metal plated layer of other metals such as copper instead of nickel plating between the steel backing layer 1 and the bearing alloy layer 3. Also the nickel plated layer between the bearing alloy layer 4 and the overlay 6 may be replaced with a metal plated layer of other materials such as copper or may be completely dispensed with.

It is also to be understood that although here the overlay consisting of 10% tin and the remainder lead is shown, it is not limited to that alloy but it may be of such other materials as having a chemical composition of 3% copper, 8% tin and the remainder of lead. In short, any mild alloy having an excellent surface sliding property should be used for the overlay.

It is to be further understood that the composite bearing of this invention may take other various shapes, such as cylindrical shapes or flanged shapes instead of the semicircular shape shown as the embodiments of this invention.

As described above, the bearing alloy and its composite bearing in accordance with the present invention are highly improved in their bearing properties, i.e., non-seizure property, compatibility and endurance property in comparison with the conventional alloys and their composite bearings. They can also be applied to many other bearings in the form of semicircular bearings, cylindrical bushings, flanged bearings, thrust washers, etc., and particularly to the bearings for use under heavy loads such as automotive bearings and industrial machine bearings, and therefore, are very useful when used in many fields.

I claim:
1. An aluminum-base bearing alloy of superior anti-sticking property and fatigue strength consisting of 2-8% by weight of zinc, 2-8% by weight of silicon, 0.1-3% by weight of copper, 0.1-3% by weight of lead and the remainder substantially aluminum, said zinc existing as a solute metal in aluminum solid solution, and said silicon and lead existing as dispersed particles.

2. An aluminum-base bearing alloy of superior anti-sticking property and fatigue strength consisting of 2-8% by weight of zinc, 2-8% by weight of silicon, 0.1-3% by weight of copper, 0.1-3% by weight of lead and 0.2-7% by weight in total of one or more elements selected from the group consisting of 0.1-2% by weight of magnesium, 0.1-3% by weight of nickel and 0.1-2% by weight of bismuth, and the remainder substantially being aluminum.

3. A composite bearing consisting of a steel plate backing or steel plate backing with a thin plating of nickel and an aluminum-base bearing alloy bonded on said steel plate bearing, which alloy consisting of 2-8% by weight of zinc, 2-8% by weight of silicon, 0.1-3% by weight of copper, 0.1-3% by weight of lead and the remainder substantially being aluminum.

4. A composite bearing consisting of a steel plate backing or steel plate backing with a thin plating of nickel and an aluminum-base bearing alloy bonded on said steel plate backing, which alloy consisting of 2-8% zinc, 2-8% silicon, 0.1-3% copper 0.1-3% lead, 0.2-7% in total of one or more elements selected from the group of magnesium, nickel and bismuth, with their respective composition limits being 0.1-2%, 0.1-3% and 0.1-2% by weight, and the remainder being substantially aluminum.

5. A composite bearing as set forth in claim 3, wherein said aluminum-base bearing alloy is provided with a lead-base overlay on the surface.

6. A composite bearing as set forth in claim 4, wherein said aluminum-base bearing alloy is provided with a lead-base overlay on the surface.

7. A composite bearing in accordance with claim 5 wherein said lead-base overlay is selected from alloys of the group consisting of 10% Sn with the remainder being essentially Pb, and 3% Cu, 8% Sn with the remainder being essentially Pb.

8. A composite bearing in accordance with claim 6 wherein said lead-base overlay is selected from alloys of the group consisting of 10% Sn with the remainder being essentially Pb, and 3% Cu, 8% Sn with the remainder being essentially Pb.

9. A bearing for a diesel engine having superior fatigue strength at heavy loads, comprising: a bearing layer consisting of 2-8% by weight of zinc, 2-8% by weight of silicon, 0.1-3% by weight of copper, 0.1-3% by weight of lead, and the remainder being substantially aluminum.

10. A bearing in accordance with claim 9 wherein said bearing layer further comprises 0.2-7% by weight in total of one or more of 0.1-2% by weight magnesium, 0.1-3% by weight nickel and 0.1-2% by weight bismuth.

* * * * *